July 17, 1928.

J. BAILEY 1,677,611

METHOD AND MEANS FOR SHAPING TEA CUPS OR THE LIKE WITH INTEGRAL HANDLES

Filed Sept. 9, 1927    2 Sheets-Sheet 1

INVENTOR
John Bailey
BY
Clarence F. Campbell
his ATTORNEY.

July 17, 1928.  
J. BAILEY  
1,677,611  
METHOD AND MEANS FOR SHAPING TEA CUPS OR THE LIKE WITH INTEGRAL HANDLES  
Filed Sept. 9, 1927  2 Sheets-Sheet 2

INVENTOR
John Bailey
BY
ATTORNEY.

Patented July 17, 1928.

1,677,611

UNITED STATES PATENT OFFICE.

JOHN BAILEY, OF COBRIDGE, STOKE-ON-TRENT, ENGLAND, ASSIGNOR TO FURNIVALS 1913 LIMITED, OF COBRIDGE, ENGLAND, A BRITISH COMPANY.

METHOD AND MEANS FOR SHAPING TEACUPS OR THE LIKE WITH INTEGRAL HANDLES.

Application filed September 9, 1927, Serial No. 218,373, and in Great Britain January 14, 1927.

My invention relates to an improvement in a method and means for shaping tea cups or the like with integral handles and the novelty lies in the steps of the process and the adaptation and arrangement of parts of the means for carrying out said process as will be more fully hereinafter pointed out.

The particular object of my invention is to produce cups and the like with their handles intact by one operation of molding or casting, the method employed enabling cups in their entirety to be expeditiously manufactured in an inexpensive manner.

The handle being formed integral with the body during the casting or molding process is not easily broken or knocked off when in use.

Prior to the date of this invention cups, mugs, jugs and like articles provided with handles have been shaped in their entirety in a mold divided vertically, the two vertical joining faces of such mold being formed with handle recesses to accommodate plastic clay for the handle of the article, such clay being joined up with the clay body during the molding thereof. Such molds produce a vertical bur or seam on the clay article which has to be removed after shaping has been accomplished.

The invention is designed with the object of producing cups and other vessels with their handles intact of a very durable character and without any bur or seam on the clay body.

My invention consists essentially in the use of a one-part plaster mold, for shaping the vessel or clay body of a cup or article, having a detachable handle portion of plaster formed in one or more parts fitting therein and readily removed therefrom after molding, jolleying, or casting of the cup or article with its handle has been completed.

Referring to the drawings Figure 1 is a sectional elevation of a one-part plaster mold, for shaping the vessel or clay body of the cup or article having a small detachable handle portion of plaster fitting therein so as to be readily removed therefrom.

Figure 6 is an elevation of a roughly formed clay handle which will be hereinafter referred to.

Figure 7 is an elevation of a cup with the handle intact produced from the mold illustrated in Figure 1.

Figure 1:
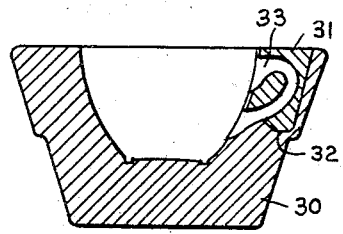

In the drawings 30 is a plaster mold and 31 the small detachable plaster portion recessed or shaped to form the cup handle simultaneously with the shaping of the clay body.

In Figures 1 to 7 the mold 30 is produced in the ordinary way from plaster, a recess 32 being provided to accommodate the detachable portion 31 which has a handle recess 33 formed therein. The said detachable portion 31 is shaped from the same mixture of plaster as the mold 30, and is constructed to make a close joint therewith.

Figures 6, 7:
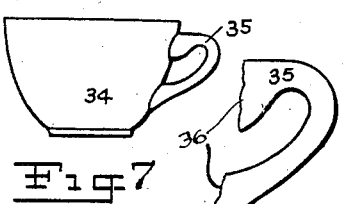
Figure 4:
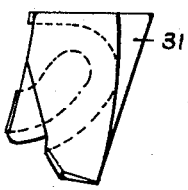
Figure 4 is an elevation of the small detachable portion of the mold which forms the handle integral with the body.
Figure 2:
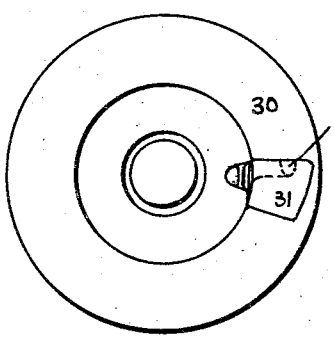
Figure 2 is a plan thereof.
Figure 3:
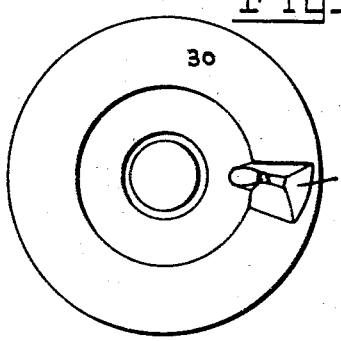
Figure 3 is a similar view to Figure 2 with the detachable portion to form the handle removed therefrom.
Figure 5:
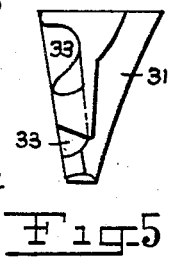
Figure 5 is a side view of Figure 4.
Figure 8:
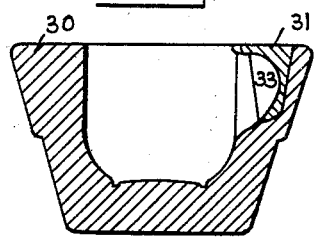
Figure 8 is a similar view to Figure 1 showing a modification of our invention.
Figures 11, 12, 13:
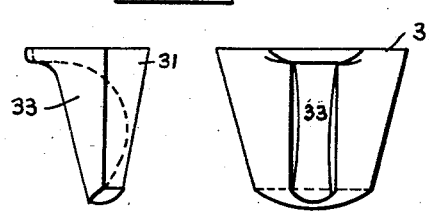
Figure 11 is an elevation of the small detachable portion of the mold which forms the handle integral with the cup body.
Figure 12 is a side view of same.
Figure 13 is a plan of Figure 11.
Figure 9:
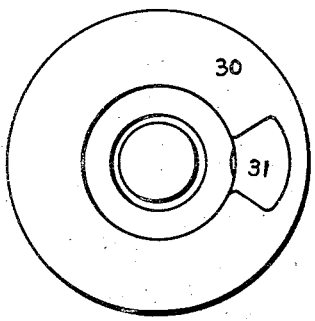
Figure 9 is a plan thereof.
Figure 10:
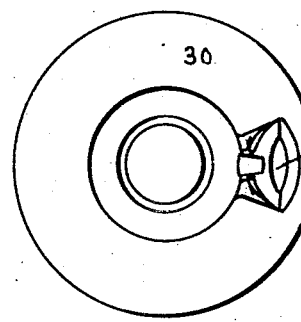
Figure 10 is a similar view to Figure 9 with the small detachable handle portion of the mold removed therefrom.

To jolley a cup 34 with the handle 35 formed integral therewith as shown at Figure 7 a roughly formed clay handle 35 (Figure 6) is first placed in the handle recess 33 of the detachable portion 31 and then it is placed in the recess 32 of the mold 30 (see Figures 1 and 3). The ends 36 of the rough shaped handle 35 (Figure 6) slightly project inside the plaster mold 30 so that it is worked in with the clay body when it is being shaped by the profile or tool of the jolley as will be understood. After the shaping of the cup in its entirety has been accomplished and the clay article has sufficiently dried, the mold is inverted in the ordinary way to allow the clay cup and the handle portion 31 to leave the mold 30. The handle mold portion 31 is supplied with another roughly shaped clay handle 35 and inserted in the recess 32, the tool of the jolley being brought into operation again as before. Cups of various shapes and with their handles intact can be jollied in an expeditious and efficient manner, such cups being of a very durable character as their handles are not easily broken or knocked off when in use.

The same plaster mold 30 may be employed for casting cups with their handles intact but in this case no roughly shaped handle is required. The clay slip is poured into the plaster mold 30 and the article is cast in the usual way. When the clay cup 34 with its handle 35 is sufficiently dry the mold is inverted as before described, the clay cup and recessed handle portion 31 leave the mold 30. The recessed handle portion 31 is placed in position again when further casting can be accomplished.

Figure 14:
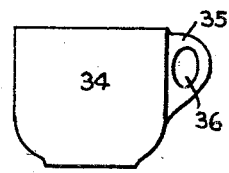
Figure 14 is an elevation of a cup with handle intact produced from the mold illustrated at Figure 8.
Figure 15:
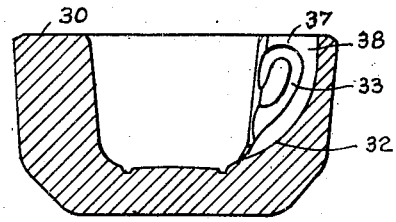
Figure 15 is a similar view to Figure 1 showing another modification of our invention, the small detachable handle portion being in this case formed in two parts.
Figure 21:
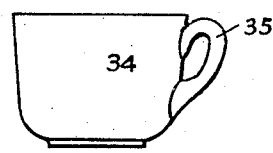
Figure 21 is an elevation of a complete teacup produced from the plaster mold illustrated at Figure 15.
Figure 16:
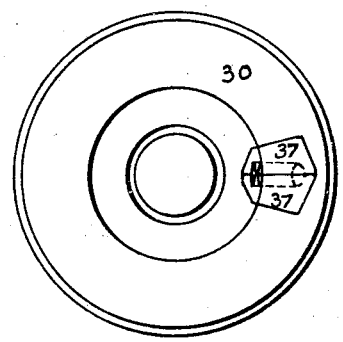
Figure 16 is a plan of same, the two-part handle portion being in position.
Figure 17:
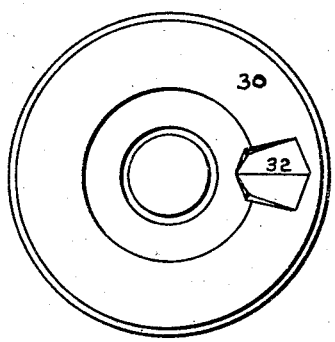
Figure 17 is a similar view to Figure 16 with the detachable portions to form the handle removed therefrom.
Figure 18:
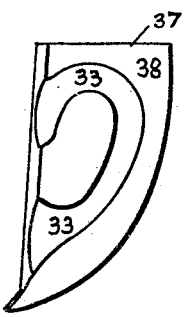
Figure 18 is an elevation of one part of the detachable portion to form the handle, each portion has a similar recess which together shape the handle.
Figure 19:
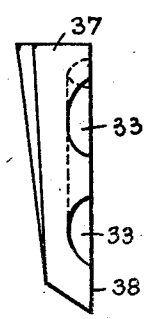
Figure 19 is a side view of same.
Figure 20:
Figure 20 is a plan of Figure 18.

Figures 8 to 13 illustrate a modification of the plaster mold previously referred to, but the cup 34 produced from such plaster mold has a block handle 35 as shown at Figure 14. The handle recess 33 is formed midway of the width of the detachable portion 31 such portion fitting into the recess 32 Figure 10 as before. To jolley a cup 34 with a block handle 35 as illustrated at Figure 14, the block handle 35 is roughly shaped in the usual well known way, that is, the center portion 36, to eventually form a hole, is pressed thin so as to be easily removed afterwards. The roughly shaped clay block handle 35 is first placed in the recess 33 of the detachable portion 31 of the mold so that the inner end slightly projects into the mold 30 and is worked in with the other clay when being shaped by the tool of the jolley. The finished clay cup 34 with the handle integral therewith is removed in the manner before described. In this mold also casting by clay slip can be readily accomplished as will be understood.

The modification of plaster mold illustrated in Figures 15 to 20 is similar to that shown in Figures 1 to 5 excepting that the detachable plaster portion is made in two halves 37 the handle recess 33 being arranged in the joining faces 38. This construction of mold can also be used for jolleying cups or for casting them in their entirety as before stated.

The clay cups produced from any of the molds hereinbefore referred to are treated and fired in the usual well known way.

I claim:

1. The process of forming a handle integral with a cup by molding comprising roughly forming by hand a clay handle and placing it in a separable handle molding member so that the ends of the handle slightly project, placing said separable member in the main molding member, and forming a cup therein in the usual well known manner, using the tool of the jolley to work the ends of said handle into the clay body of the cup while forming the same and after sufficiently drying the same inverting the mold to permit the clay cup and separable handle molding member to leave the main mold member.

2. The process of forming a handle integral with a cup comprising roughly forming a handle and placing it in a separable handle mold, so that its ends project slightly therefrom, placing the same in the main molding member and shaping the cup in the usual manner using the profile of the jolley to work the ends of said handle into the clay body and after drying sufficiently inverting the main mold to permit the clay cup and separable handle mold to leave the main mold.

3. The process of forming a handle integral with a cup comprising roughly forming a handle and placing it in the handle portion of a mold so that its ends project slightly therefrom, forming the cup in the usual well known manner in the cup portion of the mold and using the tool of the jolley to work the ends of said handle into the body of the cup and after drying sufficiently inverting the mold to permit the cup to leave the mold together with the saparable mold member.

4. In a cup mold the combination of a main mold member and a separable handle mold member fitting therein.

5. In a cup mold the combination of a main mold member and a separable handle mold member fitting therein, the latter being composed of two separable members.

6. In combination means for forming a cup and separable means in said first means for forming a handle integral with said cup.

In testimony whereof I affix my signature.

JOHN BAILEY.